Oct. 25, 1966     L. J. M. RALPH     3,281,283
METHOD OF FORMING CELLS FOR WET STORAGE BATTERIES
Filed Sept. 9, 1963     2 Sheets-Sheet 1
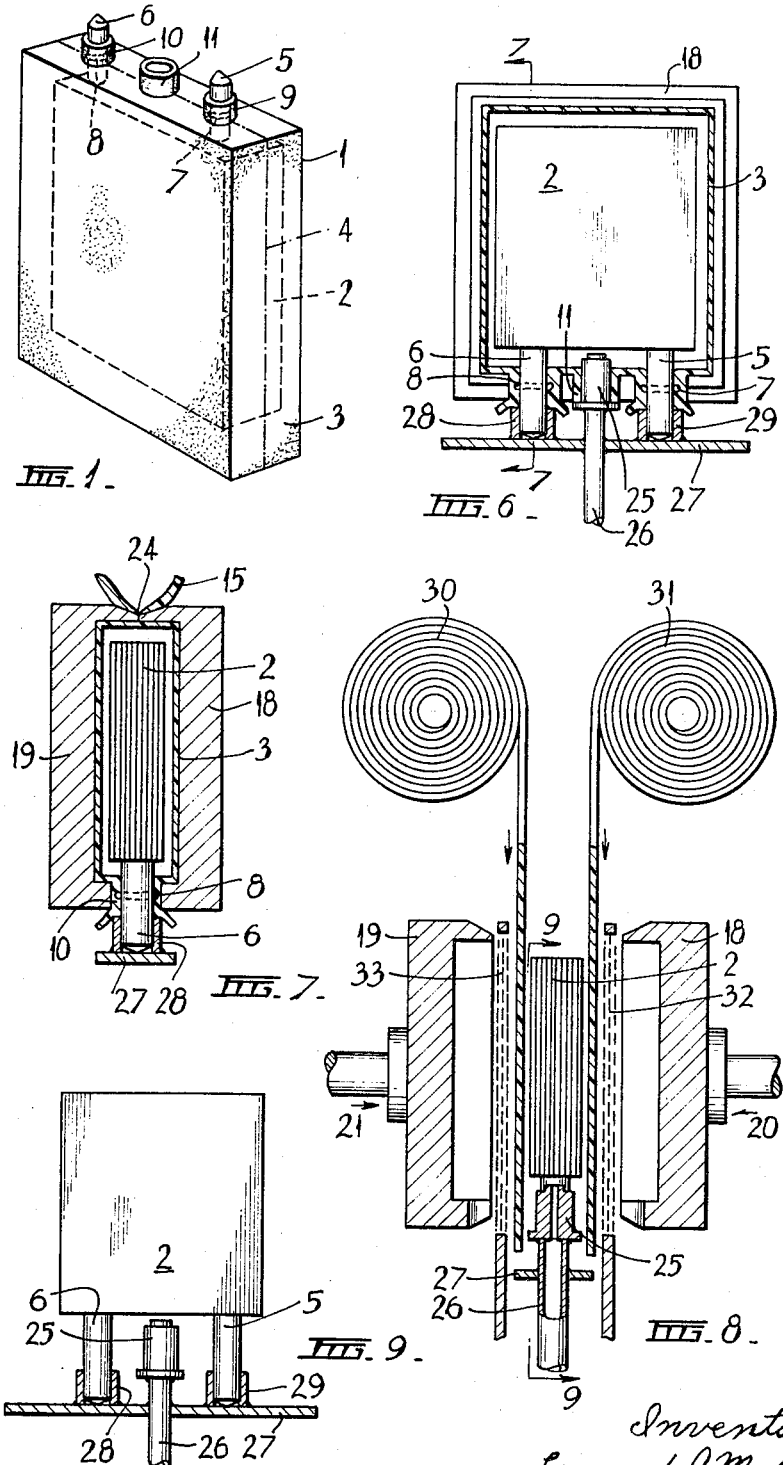
Inventor
Leonard J. M. Ralph
by Sommers & Young
Attorneys

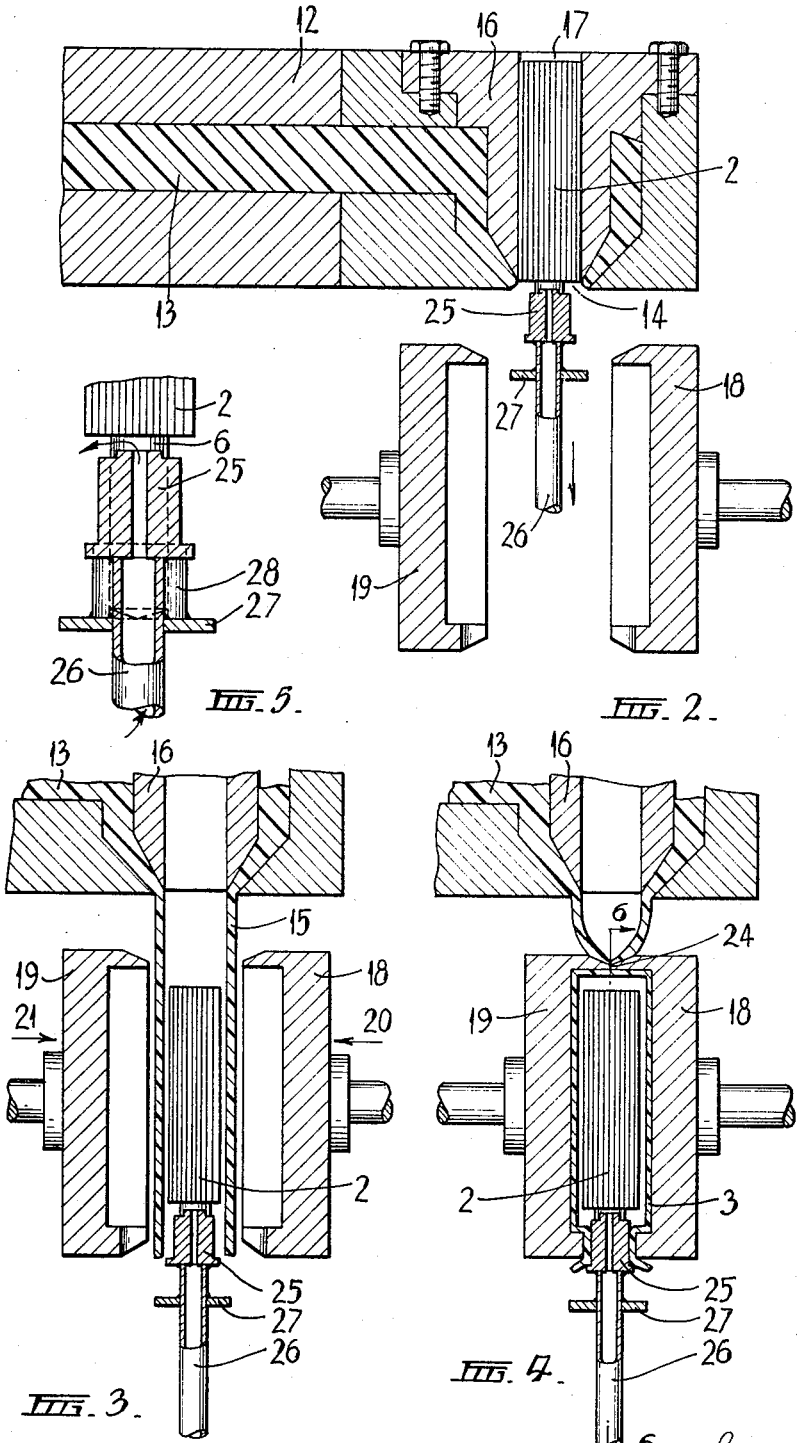

United States Patent Office 3,281,283
Patented Oct. 25, 1966

3,281,283
METHOD OF FORMING CELLS FOR WET STORAGE BATTERIES
Leonard John Michael Ralph, Essendon, Victoria, Australia, assignor to Dunlop Rubber Australia Limited, Melbourne, Victoria, Australia, a company of Australia
Filed Sept. 9, 1963, Ser. No. 307,405
Claims priority, application Australia, Sept. 14, 1962, 22,141/62
10 Claims. (Cl. 136—176)

This invention relates to cells for wet storage batteries of the general type comprising a housing, an assembly of positive and negative polarity plates disposed in said housing, said positive and negative plates being arranged in alternate formation and separated by insulating members, and two terminal posts projecting through a wall of said housing and electrically connected to the positive and negative polarity plates respectively.

Wet storage batteries usually comprise a series of such cells with the housing for each cell being formed by a compartment of a casing closed at the top by a cover plate through which the terminal posts project. In this construction, it is necessary to seal the cover plate into the case and the posts into the cover plate by caulking to prevent leakage of the electrolyte.

The production and maintenance of an effective and reliable seal between these components, is time consuming and expensive.

It is the principal object of the present invention to provide a cell for wet storage batteries of the type herein specified which is simple in construction, reliable in service and effectively sealed against leakage of electrolyte.

It is a further object of the invention to provide a method of cell manufacture which permits the use of one or more of the conventional methods of thermoforming plastic materials, e.g. blow moulding, vacuum or drape moulding or the like.

With the above stated principal object in view, there is provided according to the present invention a cell for a wet storage battery of the type herein specified comprising a one piece housing made of thermo-plastic, electrolyte resistant, insulating material enclosing the assembly of plates and sealing around or about the periphery of the terminal posts.

Conveniently the one-piece housing is formed by blow moulding or similar known thermoforming techniques, using any of the well known thermoplastic materials such as polypropylene, high density polyethylene or high impact polystyrene. A sleeve of vulcanised rubber may be placed around the terminal posts so that upon cooling the thermoplastic material will shrink and squeeze onto or about the rubber sleeve to produce an effective electrolyte seal. In the completed cell the only parts protruding from the one-piece housing constituting the enclosing case of the cell are the sealed terminal posts.

Thermoforming techniques, envisaged as being useful in supplementing or even replacing, the blow moulding above referred to are for example vacuum or drape moulding or vacuum assisted blow moulding.

There is also provided according to the present invention a method of manufacturing a cell for a wet storage battery of the type herein specified comprising thermoforming in situ around and in spaced relation to the assembly of plates, a one-piece housing of thermoplastic electrolyte resistant insulating material to enclose said plates and sealing said one-piece housing around or about the periphery of the terminal posts.

To form a multi cell battery, the cells in the number required are assembled in a fabricated, thermoformed, injection moulded or metal tray-like container. A cover or frame which may be of construction similar to that of the tray is provided to hold the cells together at the top edges of the cell. The cover may or may not enclose the intercell connecting straps.

The invention will be more readily understood from the following description by way of illustration of one practical method of manufacturing the cell.

A plastic extruder of known type, preferably designed for intermittent operation, having a vertical crosshead with a hollow mandrel and die arranged by means well known in the art, to give uniform distribution of material around the mandrel is used. The mandrel and die are arranged so that the extrudate is in the form of a rectangular tube or parison, the dimensions of which are such that the plate assembly is contained within the parison.

Situated conventionally beneath the crosshead is a two piece blow-moulding mould which is arranged to move together in the horizontal direction and is provided with means for being securely locked in the closed position.

A carrier for the plate assembly is arranged to support the assembly by the electrode posts, and is provided with a mandrel around which is formed the filler hole in a cell case. The mandrel is drilled axially to provide an entry point for the blowing air. The carrier is arranged to move vertically through the open blow-mould die along the axis of the parison tube. A rubber sleeve may be placed on each electrode post of the plate assembly.

The moulding operation is as follows:

During the time when the extruder is accumulating a charge, the mould is in the open position and the carrier is in its top-most position. A plate assembly is then inserted through the hollow mandrel and supported by the carrier. When the extruder has accumulated a sufficient charge the parison is extruded. The carrier now moves downwardly at the same speed as the parison which now encloses the plate assembly. At the completion of the extrusion stroke the carrier stops at a suitable station for the blow mould to close about the parison and plate assembly. Compressed air is now introduced inside the parison through the hole in the carrier mandrel and the parison is blown to the shape of the mould cavity and after moulding the cell the mould is cooled and opened and the case containing the plate assembly is removed, and the carrier returned to its topmost position, ready for the next cycle.

Alternatively the ram extruder may be arranged to extrude two parallel sheets of thermoplastic material in spaced relation either side of the position to be occupied by the plates with the mould halves spaced either side of said sheets. In this arrangement the plate assembly carrier may be arranged to move horizontally into and out of the open mould, the plate assembly being loaded when the carrier is in the outside position. The carrier may also be arranged to move vertically. From whichever position is chosen, the plate assembly is then moved into the moulding position. The parallel sheets are extruded one on each side of the plate assembly.

After the mould is closed blowing can proceed as previously described. In this arrangement the mould is provided with pinch off lands around the whole circumference of the mating faces and not only at the ends as is done in conventional blow moulding.

Although as described above, the blowing mould is supplied with material from an extruder, it will be appreciated that the material could be supplied from an electrically heated injection ram. Alternatively the material could be supplied in sheet form which is then heated to a plastic state by any of the means used in the plastics thermo-forming field.

It will be further appreciated that the forming of the case within the mould can also be accomplished by applying vacuum through ventholes which pass through the mould into the cavity. In this instance the plastic material is sucked out to contact the face of the cavity.

Practically speaking, it may be said that the present invention provides an individual cell consisting of an assembly of one set each of opposite polarity plates and separators, each set of each polarity plates being joined to a bus bar to which is affixed (welded, clamped, etc.) a terminal post (i.e. 2 terminal posts per cell). Such an assembly with the exception of the upper portion of the terminal posts is completely enclosed in an integral covering or case composed of a thermoformable, electrolyte resistant, plastic. This produces a cell which has no separate lid, and importantly requires no subsequent use of caulking compound or adhesive. There are no protuberances on the top of the cell assembly other than the two terminal posts (positive and negative), the only orifice in the cell top being a filler orifice provided for the addition of electrolyte to the cells. The plate assemblies initially joined to their corresponding bus bar and terminal posts are treated as one unit during the process of thermo-forming the covering material (such as polypropylene) around the plate assembly. No post bush is required or welding of post bush to the post.

The method according to the present invention of blow moulding the outer covering of the cell provides a very effective means of making a fluid tight seal between the post and the top of the blow moulding, utilising, if desired, a rubber sleeve around the post as a fluid-tight seal, made more secure by the difference in thermal contraction rates of the post, sleeve and cell covering material.

The invention will be more clearly appreciated from a reading of the following description referring to the accompanying drawings which is given by way of illustration only and which is not to be construed as limiting upon the broad concept of the invention.

In the drawings the illustrations are as follows:

FIGURE 1 a battery cell made in accordance with the invention;

FIGURE 2, an apparatus for extruding a parison (and for a mould assembly) at the commencement of the extrusion;

FIGURE 3, the apparatus represented in FIGURE 2 at a slightly later stage in carrying out the method;

FIGURE 4 is similar view to FIGURES 2 and 3 showing the mould in the fully closed position;

FIGURE 5 is a detailed view of part of the carrier apparatus;

FIGURE 6 is a section along the line 6—6 in FIGURE 4;

FIGURE 7 is a section along the line 7—7 in FIGURE 6 after the assembly has been blown;

FIGURE 8 illustrates an alternative method of procedure in accordance with the invention; and FIGURE 9 the carrier with the plate assembly in position.

Like reference numerals in the several figures have a like significance.

The cell 1 comprises an assembly of plates 2 surrounded by the outer case 3 showing a line 4 where the die was closed during the moulding operation.

Terminal posts 5 and 6 protrude through the top of the case and are covered by moulded sleeves 7 and 8 which cover said terminals and also rubber sleeves 9 and 10 which give added protection against leakage from the body of the cell. A filler neck 11 is also situated in the top of the case.

In FIGURE 2 is seen a part of an extrusion apparatus, generally designated 12, wherein the plastic material 13 is softened by means not shown and extruded through a rectangular aperture 14 to form the parison 15 shown in section in FIGURE 3.

The central core or mandrel 16 of the extrusion apparatus 12 is provided with a cavity 17 in which the assembly of plates 2 is housed at the commencement of the operation and in which it is held by means of the carrier 27 slidably mounted so as to permit the downward transportation of the assembly of plates.

At each side of the orifice 14 of the extrusion apparatus are mounted two halves of a mould 18 and 19 which forms the base and walls of the battery case which are urged towards one another, in the direction of arrows 20 and 21, when the parison 15 has been produced and is in the position indicated in FIGURE 3.

The ends of each mould half are appropriately chamfered and arranged so that when the mould is closed the jaws meet and weld together the opposite faces of the parison as shown in FIGURE 4 at 24.

Also the lower ends of the mould halves shown in FIGURES 4 and 5 embrace the terminal posts and a blowing mandrel 25 which is connected to a compressed air supply, not shown, by line 26.

When the mould halves 18 and 19 have met, as in FIGURE 4, the lower end of the mould meets about the terminal posts and the carrier and blowing member to produce a battery completely sealed about the terminal posts and leaving only the filler opening unsealed when the mould is removed and the moulding trimmed.

Before opening the mould and whilst the parison is still in a plastic state air is forced into the battery assembly under pressure via the blowing mandrel to ensure that the parison which has now become the battery case conforms precisely to the form of the inner walls of the mould halves and that the terminal posts are completely covered and sealed by their moulded sleeves.

The bottom portion of the carrier 27 has mounted in it the air line associated with the blowing mandrel as well as two cups 28 and 29 provided to accommodate and fit neatly about the terminal posts.

In the alternative construction illustrated in FIGURE 8, two reels of plastic sheet material 30 and 31 are fed one either side of the plate assembly each sheet being between the plate assembly and heating elements 32 and 33, which are removably mounted on either side of said plate assembly.

On each side of the plate assembly and remote from it are mounted the mould halves.

A carrier assembly similar to that shown in FIGURE 6 serves to carry the plate assembly as shown in FIGURE 9.

I claim:

1. A method for producing a cell for a wet storage battery comprising an assembly of positive and negative polarity plates arranged in alternate formation and separated by insulating members having two terminal posts connected respectively to the positive and negative polarity plates, said posts projecting through a wall of said cell made of a thermoplastic, electrolyte-resistant, insulating material comprising thermoforming in situ and in spaced relation to said assembly of plates and insulating members a one-piece housing of thermoplastic electrolyte-resistant insulating material to enclose said assembly and to seal about the periphery of the terminal posts.

2. A method for producing a cell for a wet storage battery comprising an assembly of positive and negative polarity plates arranged in alternate formation and separated by insulating members having two terminal posts connected respectively to the positive and negative polarity plates, said posts projecting through a wall of said cell made of a thermoplastic, electrolyte-resistant, insulating material, comprising locating a parison of thermoplastic, electrolyte-resistant, insulating material about an assembly of plates as above defined, thermo-forming said parison in a blow mould to form, in situ, a one-piece housing about said plate assembly and to seal said housing about the periphery of the terminal posts, cooling the battery cell so formed and removing same from said mould.

3. A method as claimed in claim 2 wherein vulcanized rubber sealing rings are fitted on the terminal posts prior to moulding the parison about the assembly of plates.

4. A method for producing a cell for a wet storage battery comprising an assembly of positive and negative polarity plates arranged in alternate formation and separated by insulating members having two terminal posts connected respectively to the positive and negative polarity plates, said posts projecting through a wall of said cell made of a thermoplastic, electrolyte-resistant, insulating material, comprising locating a sheet of thermoplastic, electrolyte-resistant, insulating material, on each of two parallel sides of an assembly of plates as above defined, thermo-forming said sheets in a blow mould to form, in situ, a one-piece moulding about said plate assembly and to seal said moulding about the periphery of the terminal posts, cooling the battery cell so formed and removing same from said mould.

5. A method as claimed in claim 4 wherein vulcanized rubber sealing rings are fitted on the terminal posts prior to moulding said sheets of thermoplastic, electrolyte-resistant insulating material about the assembly of plates.

6. A method for producing a cell for a wet storage battery comprising an assembly of positive and negative polarity plates arranged in alternate formation and separated by insulating members having two terminal posts connected respectively to the positive and negative polarity plates, said posts projecting through a wall of said cell made of thermoplastic, electrolyte-resistant, insulating material, comprising locating a cell plate assembly mounted on a carriage having an air inlet and provided with cavities wherein to locate the terminal posts in a cavity within an extrusion apparatus, extruding a parison of thermoplastic electrolyte-resistant, insulating material, dimensioned to cover said cell plate assembly, advancing the cell plate assembly and the parison downwardly to a station located between two mould members adapted to mould a one-piece moulding about said assembly, closing the mould members and said carriage about said assembly to form a one-piece moulding, blowing compressed air into said moulding to cause the walls to conform to the inner configuration of the mould and to seal the top and bottom of the moulding, cooling the moulding and extracting the moulded battery cell.

7. A method as claimed in claim 6 wherein vulcanized rubber sealing rings are fitted on the terminal posts prior to moulding the parison about the assembly of plates.

8. A method for producing a cell for a wet storage battery comprising an assembly of positive and negative polarity plates arranged in alternate formation and separated by insulating members having two terminal posts connected respectively to the positive and negative polarity plates, said posts projecting through a wall of said cell made of a thermoplastic, electrolyte-resistant, insulating material, comprising locating a cell plate assembly mounted on a carriage having an air inlet and provided with cavities wherein to locate the terminal posts in a cavity within an extrusion apparatus having two mould members adapted to mould a one piece moulding about said assembly, between two parallel sheets of thermoplastic, electrolyte resistant, insulating material, heating said sheets of plastic material until mouldable, closing the mould members and said carriage about said assembly to form a one-piece moulding, blowing compressed air into said moulding to cause the walls to conform to the inner configuration of the mould and to seal the top and bottom of the moulding, cooling the moulding and extracting the moulded battery cell.

9. A method as claimed in claim 8 wherein vulcanized rubber sealing rings are fitted on the terminal posts prior to moulding the sheets of plastic material about the assembly of plates.

10. A method for producing a cell for a wet storage battery comprising an assembly of positive and negative polarity plates arranged in alternate formation and separated by insulating members having two terminal posts connected respectively to the positive and negative polarity plates, said posts projecting through a wall of said cell made of a thermoplastic, electrolyte-resistant, insulating material, comprising locating a cell plate assembly mounted on a carriage having an air inlet and provided with cavities wherein to locate the terminal posts in a cavity within an extrusion apparatus having two mould members adapted to mould a one piece moulding about said assembly between two parallel sheets of thermoplastic, electrolyte-resistant, insulating material, which are extruded either side of the assembly of plates, heating the sheets of plastic until mouldable, closing the mould members and said carriage about said assembly to form a one-piece moulding, blowing compressed air into said moulding to cause the walls to conform to the inner configuration of the mould and to seal the top and bottom of the moulding, cooling the moulding and extracting the moulded battery cell.

References Cited by the Examiner

UNITED STATES PATENTS

| | | | |
|---|---|---|---|
| 1,329,917 | 2/1920 | Marko | 136—168.1 X |
| 2,801,276 | 7/1957 | Toce et al. | 136—166 |
| 3,080,445 | 3/1963 | Brown | 136—132 X |

WINSTON A. DOUGLAS, *Primary Examiner.*

D. L. WALTON, *Assistant Examiner.*